US008789960B2

(12) United States Patent
Yokota

(10) Patent No.: US 8,789,960 B2
(45) Date of Patent: Jul. 29, 2014

(54) ILLUMINATION DEVICE, DISPLAY DEVICE, AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

(21) Appl. No.: 13/320,781

(22) PCT Filed: Feb. 17, 2010

(86) PCT No.: PCT/JP2010/052312
§ 371 (c)(1),
(2), (4) Date: Nov. 16, 2011

(87) PCT Pub. No.: WO2010/146893
PCT Pub. Date: Dec. 23, 2010

(65) Prior Publication Data
US 2012/0074440 A1 Mar. 29, 2012

(30) Foreign Application Priority Data

Jun. 15, 2009 (JP) ................................ 2009-141741

(51) Int. Cl.
F21V 23/06 (2006.01)
G02F 1/13357 (2006.01)
G02F 1/1335 (2006.01)

(52) U.S. Cl.
CPC ........... *F21V 23/06* (2013.01); *G02F 1/133603* (2013.01); *G02F 1/133606* (2013.01)
USPC ............................. 362/97.2; 362/97.3; 349/64

(58) Field of Classification Search
CPC .............. F21V 23/06; G02F 1/133603; G02F 1/133606; F21S 2/00; F21S 2/005; F21S 4/008

USPC .................................... 362/97.2, 97.3; 349/64
See application file for complete search history.

(56) References Cited

U.S. PATENT DOCUMENTS 7,350,937 B2 * 4/2008 Yamamoto et al. ....... 362/249.01
7,438,436 B2 * 10/2008 Moon ........................... 362/247
(Continued)

FOREIGN PATENT DOCUMENTS

DE 10 2007 023 651 A1 11/2008
JP 2008-041546 A 2/2008
(Continued)

OTHER PUBLICATIONS

Official Communication issued in International Patent Application No. PCT/JP2010/052312, mailed on May 18, 2010.

*Primary Examiner* — Evan Pert
(74) *Attorney, Agent, or Firm* — Keating & Bennett, LLP

(57) ABSTRACT

A backlight unit (49) of a display device (69) having a liquid crystal display panel (59) is provided with a chassis (41), a diffusion plate (43) supported by the chassis, and a light source which irradiates the diffusion plate with light. The light source is constructed by combining a plurality of mounting substrates (21) provided with an LED (22) which serves as the light-emitting element and a diffusion lens (24) for covering the LED. Connectors (25A) are mounted on matching edges of the plurality of mounting substrates to electrically connect the substrates. The connectors are placed so as not to interfere with the illumination light region in which the LED imparts brightness to the diffusion plate. In order to achieve this state of non-interference, a beveled part (26) is formed on the side of the connectors facing the LED.

11 Claims, 8 Drawing Sheets

(56) References Cited

U.S. PATENT DOCUMENTS

| | | | |
|---|---|---|---|
| 7,621,655 B2 * | 11/2009 | Roberts et al. | 362/249.02 |
| 7,633,577 B2 * | 12/2009 | Moon et al. | 349/69 |
| 7,648,254 B2 * | 1/2010 | Yoo et al. | 362/249.01 |
| 7,824,073 B2 * | 11/2010 | Hsieh et al. | 362/249.11 |
| 8,511,857 B2 * | 8/2013 | Yun et al. | 362/249.14 |
| 8,553,170 B2 * | 10/2013 | Park et al. | 349/58 |
| 2005/0265051 A1 * | 12/2005 | Yamamoto et al. | 362/657 |
| 2006/0289201 A1 | 12/2006 | Kim et al. | |
| 2007/0007539 A1 * | 1/2007 | Kim et al. | 257/88 |
| 2007/0115671 A1 * | 5/2007 | Roberts et al. | 362/367 |
| 2007/0297163 A1 | 12/2007 | Kim et al. | |
| 2008/0036940 A1 * | 2/2008 | Song et al. | 349/61 |
| 2008/0259240 A1 | 10/2008 | Song et al. | |
| 2010/0118532 A1 * | 5/2010 | Liang et al. | 362/235 |
| 2010/0277666 A1 | 11/2010 | Bertram et al. | |

FOREIGN PATENT DOCUMENTS

| | | |
|---|---|---|
| JP | 2008-147147 A | 6/2008 |
| JP | 2009-076456 A | 4/2009 |

\* cited by examiner

ILLUMINATION DEVICE, DISPLAY DEVICE, AND TELEVISION RECEIVER

TECHNICAL FIELD

The present invention is related to an illumination device, a display device including the illumination device, and a television receiver having the display device.

BACKGROUND ART

Display devices using a display panel such as a liquid crystal display panel, which does not emit light itself, typically incorporate an illumination device that illuminates the display panel from behind. Various types of light sources including cold cathode tubes and light emitting elements are used as the light source of such an illumination device. Examples of such light emitting elements include light emitting diodes (hereinafter referred to as "LEDs"), organic electroluminescence elements, inorganic electroluminescence elements, among which LEDs are used the most commonly today. The light sources of the illumination device disclosed in Patent Literature 1 are also LEDs.

In the illumination device disclosed in Patent Literature 1, as shown in FIG. 8, LEDs 122 are mounted on the mounting board 121, and further, lenses 124 each covering a corresponding one of the LEDs 122 are attached to the mounting board 121. The mounting board 121, the LED 122, and the lens 124 together form a light emitting module mj. The lenses 124 are each formed in a shape of a hemisphere dome with even thickness, and transmit light emitted from the LEDs 122 without significant refraction. Thus, if the LEDs 122 face upward as shown in FIG. 8, a large part of the light proceeds in a direction close to the vertical direction.

CITATION LIST

Patent Literature

Patent Literature 1: JP-A-2008-41546

SUMMARY OF INVENTION

Technical Problem

Only a single mounting board 121 is illustrated in FIG. 8, but a case of illuminating a large area may require a configuration in which a plurality of mounting boards 121 are connected to each other with connectors. The illumination device of FIG. 8 is originally designed as a backlight of a liquid crystal display device, and irradiates a diffusion plate with light from a large number of LEDs 122 to give the diffusion plate even brightness; here, if a plurality of mounting boards 121 are connected to each other with connectors, the connectors may block the light from the LEDs 122 to cast their shadows onto the diffusion plate.

The present invention has been made in view of the foregoing, and an object of the present invention is, with respect to an illumination device that irradiates a diffusion plate with light from a light source built as a combination of a plurality of mounting boards on which light emitting elements are mounted, to prevent connectors used for connecting the mounting boards to each other from causing uneven brightness of the diffusion plate.

Solution to Problem

According to a preferred embodiment of the present invention, in an illumination device including a diffusion plate and a light source which irradiates the diffusion plate with light, the light source is configured by combining a plurality of mounting boards on each of which a light emitting element is mounted, connectors are attached to corresponding edges of the plurality of mounting boards to electrically connect the mounting boards to each other, and the connectors are placed in a state in which the connectors do not interfere with an irradiation light region in which the light emitting element imparts brightness to the diffusion plate.

With this configuration, light that imparts brightness to the diffusion plate is not blocked by the connectors, and thus the diffusion plate does not suffer from uneven brightness caused by the connectors.

According to a preferred embodiment of the present invention, the illumination device configured as described above further includes a diffusion lens that covers the light emitting element. Here, light from the diffusion lens forms the irradiation light region.

With this configuration, the light from the diffusion lens is not blocked by the connectors, and thus the diffusion plate does not suffer from uneven brightness caused by the connectors.

According to a preferred embodiment of the present invention, in the illumination device configured as described above, among edges of the connectors, at least an edge which is located on a side that faces the light emitting element is formed to be away from the light emitting element, to thereby impart to the connectors a shape which allows the connectors to be in a state in which the connectors do not interfere with the irradiation light region.

With this configuration, it is possible to eliminate unevenness in brightness by changing the shape of the connectors, and thus the object of the present invention is easily achieved.

According to a preferred embodiment of the present invention, in the illumination device configured as described above, among the edges of the connectors, at least the edge which is located on the side that faces the light emitting element is formed to be away from the light emitting element by forming a beveled part at the edge.

With this configuration, the shape of the connectors is easily changed simply by forming the beveled part in the connectors.

According to a preferred embodiment of the present invention, in the illumination device configured as described above, among the edges of the connectors, at least the edge which is located on the side that faces the light emitting element is formed to be away from the light emitting element by forming a rounded part at the edge.

With this configuration, the shape of the connectors is easily changed simply by forming the rounded part in the connectors.

According to a preferred embodiment of the present invention, in the illumination device configured as described above, among the edges of the connectors, at least the edge which is located on the side that faces the light emitting element is formed to be away from the light emitting element by forming a stepped part at the edge.

With this configuration, the shape of the connectors is easily changed simply by forming the stepped part in the connectors.

According to a preferred embodiment of the present invention, in the illumination device configured as described above, a height of the connectors is reduced, to thereby impart to the connectors a shape which allows the connectors to be in a state in which the connectors do not interfere with the irradiation light region.

With this configuration, it is possible to eliminate uneven brightness by changing the size of the connectors, and thus the object of the present invention is easily achieved.

According to a preferred embodiment of the present invention, in the illumination device configured as described above, the light emitting element is an LED.

With this configuration, it is possible to obtain a bright illumination device by using LEDs brightness of which has recently been remarkably increased.

According to a preferred embodiment of the present invention, a display device includes: any illumination device of the illumination devices configured as described above; and a display panel which receives light from the illumination device.

With this configuration, it is possible to obtain a display device free from brightness unevenness stemming from the connectors.

According to a preferred embodiment of the present invention, in the display device configured as described above, the display panel is a liquid crystal display panel.

With this configuration, it is possible to obtain a liquid crystal display device free from brightness unevenness stemming from the connectors.

According to a preferred embodiment of the present invention, a television receiver includes the display device configured as described above.

With this configuration, it is possible to obtain a television receiver in which the screen is free from brightness unevenness stemming from the connectors.

Advantageous Effects of Invention

According to the present invention, light from the light emitting element that imparts brightness to the diffusion plate is not blocked by the connectors, and thus the connectors do not cause uneven brightness, and this helps improve the quality of images displayed on the display device incorporating the display panel that receives light from the illumination device of the present invention. This further helps improve the image quality of the television receiver incorporating the display device.

DESCRIPTION OF EMBODIMENTS

Figure 1:
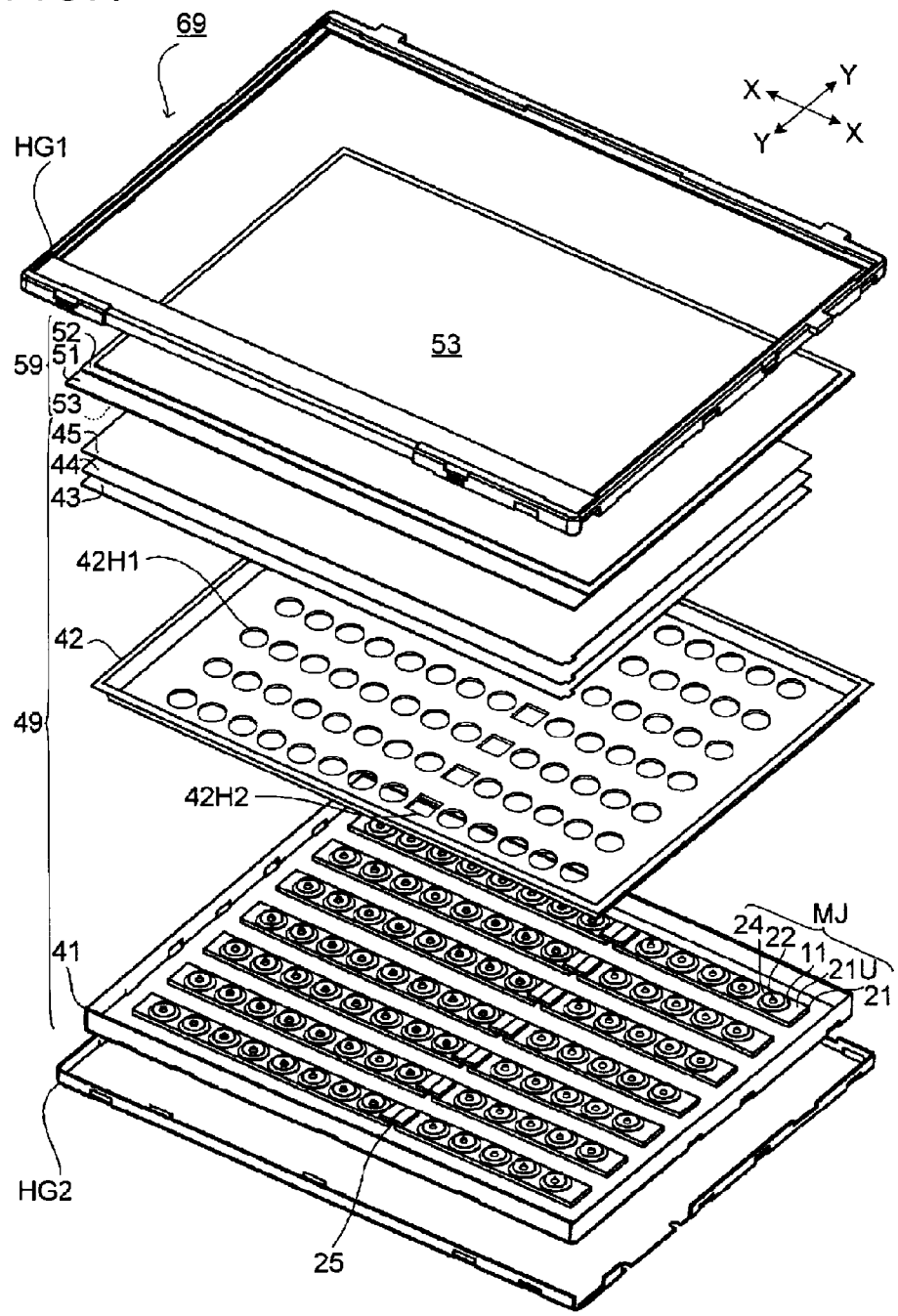
[FIG. 1] An exploded perspective view showing a display device including an illumination device according to a preferred embodiment of the present invention.

A description will be given of an embodiment of the configuration of a display device provided with an illumination device according to a preferred embodiment of the present invention, based on FIGS. 1 to 3. In FIG. 1, a display device 69 is illustrated as being horizontally placed with a display surface thereof up.

The display device 69 uses a liquid crystal display panel 59 as a display panel. The liquid crystal display panel 59 and a backlight unit 49 that illuminates the liquid crystal display panel 59 from behind are accommodated in a single housing. The housing is formed by combining a front housing member HG1 and a rear housing member HG2.

The liquid crystal display panel 59 is formed by fixing an active matrix substrate 51 that includes a switching element such as a thin film transistor (TFT) and a counter substrate 52 that is located opposite to the active matrix substrate 51 to each other with an unillustrated seal member placed therebetween, and filling the space between the active matrix substrate 51 and the counter substrate 52 with liquid crystal.

Polarization films 53 are fixed one to each of the light receiving side of the active matrix substrate 51 and the light output side of the counter substrate 52. The liquid crystal display panel 59 forms an image by making use of variation in light transmittance resulting from tilting of liquid crystal molecules.

The backlight unit 49, which embodies the illumination device according to the present invention, has the following configuration. That is, the backlight unit 49 includes light emitting modules MJ, a chassis 41, a reflection seat 42, a large-size diffusion plate 43, a prism seat 44, and microlens sheet 45.

The light emitting modules MJ each include a mounting board 21, an LED 22 as a light emitting element, a diffusion lens 24, and a built-in reflection sheet 11.

Figure 8:
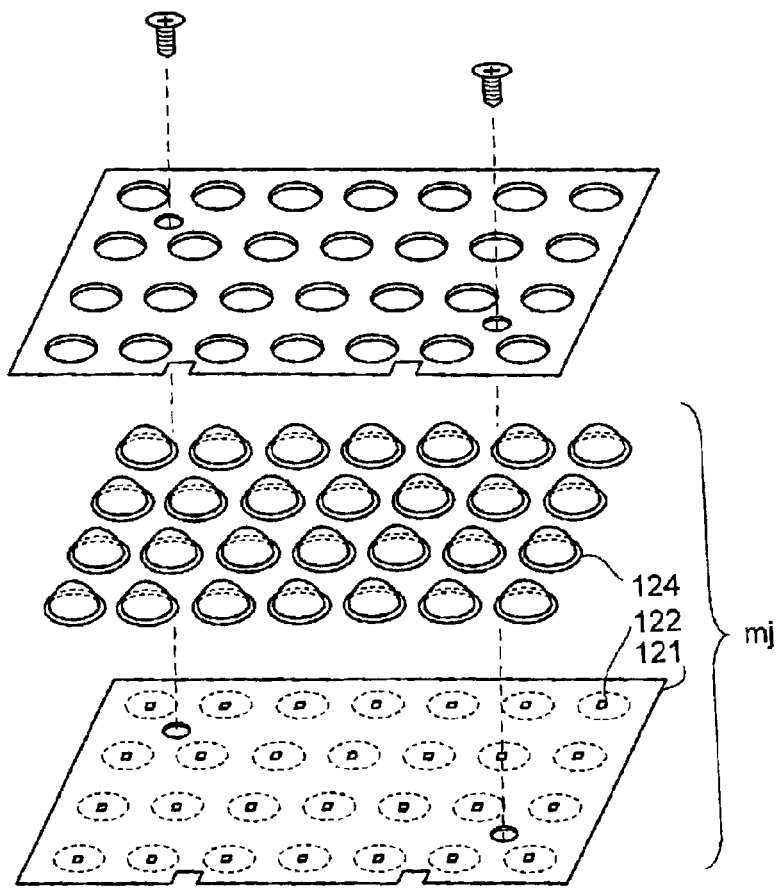
[FIG. 8] An exploded perspective view showing a conventional illumination device.

Now, a description will be given of the importance of the diffusion lens 24. Take, for example, the illumination device disclosed in Patent Literature 1. Although the illumination device shown in FIG. 8 includes lenses 124 incorporated therein, since light from each of the LEDs 122 is emitted in a small range of directions, a large number of light emitting modules mj need to be arranged in a high density. This increases the cost for preparing and mounting the components, making the illumination device expensive as a whole.

Recently, the brightness of LEDs has been significantly increased, so that it is now possible to obtain a sufficient amount of light to cover the entire screen with a comparatively small number of LEDs. However, if a small number of high-brightness LEDs are sparsely arranged, it is impossible to prevent uneven brightness, and thus, it is preferable to use a lens that is highly capable of diffusing light (such a lens will herein be referred to as "diffusion lens") in combination with each LED.

Figure 9:
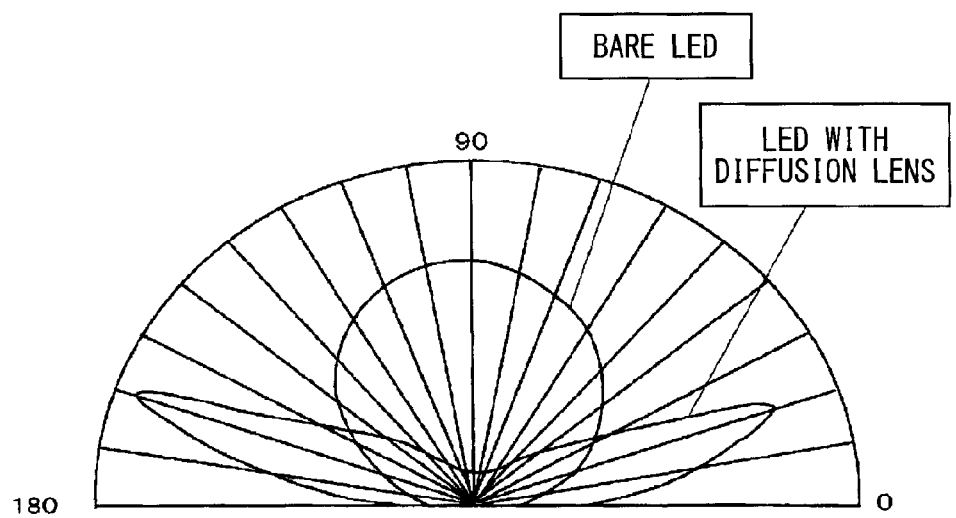
[FIG. 9] A graph showing how illuminance differs in different directions of irradiation from an LED.

FIG. 9 is a graph showing how illuminance (unit: Lux) differs in different irradiation directions in a case of a bare LED and in a case of an LED combined with a diffusion lens. In the case of the bare LED, the illuminance is highest at an angle of 90°, which is the angle of the optical axis, and sharply decreases farther away from there. In contrast, in the case of the LED combined with a diffusion lens, illuminance of a certain level or higher can be secured in a wider area, and the peak of illuminance can be set at an angle that is different from the angle of the optical axis. Needless to say, the pattern of illuminance shown in the figure can be changed as desired by accordingly designing the diffusion lens.

Figure 10:
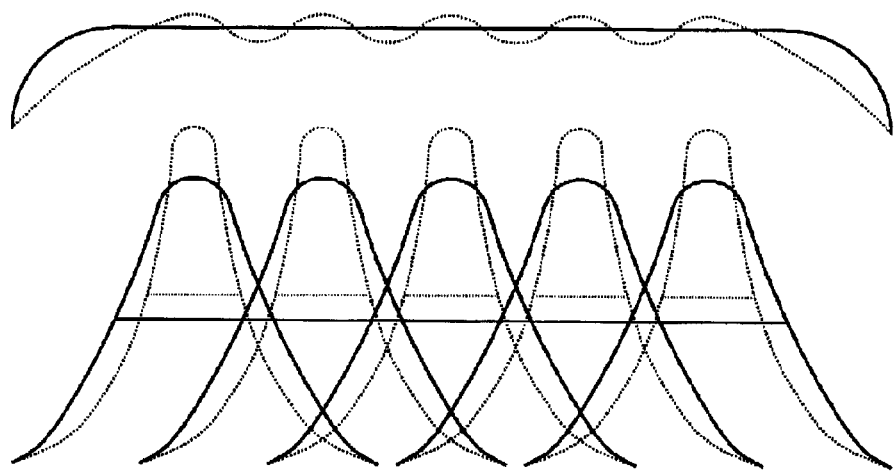
[FIG. 10] A conceptual diagram showing how brightness of a plurality of LEDs gathers.

FIG. 10 conceptually shows how brightness of a plurality of LEDs gathers. In the figure, the solid-line waveforms indicate the brightness of LEDs each combined with a diffusion lens, while the broken-line waveforms indicate the brightness of bare LEDs. The horizontal lines among the waveforms indicate widths (full width at half maximum) of the waveforms at brightness of levels half the peak levels. In the case of the LEDs each combined with a diffusion lens, each wave can have a large width, and thus it is easy to generate integrated, collective brightness as flat brightness as shown in the upper part of the figure. In contrast, in the case of the bare LEDs, the waveforms each have a high peak but have a narrow width, and thus it is impossible to avoid generation of waves in the brightness made by gathering the waveforms. Unevenly bright images are not desirable, so it is almost indispensably necessary to adopt the LED combined with a diffusion lens.

In view of the above, the light emitting module MJ is provided with the diffusion lens 24.

Each of the mounting boards 21 have a shape of elongate rectangle, and on its upper surface which is formed as a mount surface 21U, a plurality of electrodes (not shown) are formed to be arranged at predetermined intervals in the length direction. The LEDs 22 are mounted on the electrodes. The mounting board 21 functions as a common mounting board for the plurality of LEDs 22. That is, a plurality of units each composed of a LED 22, a diffusion lens 24, and a built-in reflection sheet 11 are arranged at predetermined intervals along the length direction on the mounting board 21 as shown in FIG. 1.

The diffusion lens 24 is circular in plan, and has a plurality of legs 24a on a lower surface thereof. The tips of the legs 24a are bonded to the mount surface 21U of the mounting board 21 with an adhesive, and thereby the diffusion lens 24 is attached to the mounting board 21. The presence of the legs 24a generates a gap between the mounting board 21 and the diffusion lens 24. An air flow passes through the gap, and the LED 22 is cooled by the air flow. Incidentally, on the condition that heat dissipation is secured, it is possible to use an integrally molded light emitting module in which an LED is embedded in a diffusion lens.

Various types of LEDs can be used as the LED 22. For example, it is possible to use an LED that is formed by combining a blue light-emitting LED chip with a fluorescent substance that emits yellow fluorescence on receiving light from the LED chip, the LED generating white light by mixing the blue light and the yellow light emitted by them. It is also possible to use an LED that is formed by combining a blue light-emitting LED chip with fluorescent substances that respectively emit green fluorescence and red fluorescence on receiving light from the LED chip, the LED generating white light by mixing the blue light, the green light, and the red light emitted by them.

It is also possible to use an LED that is formed by combining a red light-emitting LED chip, a blue light-emitting LED chip, and a fluorescent substance that emits green fluorescence on receiving blue light from the blue light-emitting LED chip, the LED generating white light by mixing the red light, the blue light, and the green light emitted by them.

It is also possible to use an LED that is formed by combining a red light-emitting LED chip, a green light-emitting LED chip, and a blue light-emitting LED chip, the LED generating white light by mixing the red light, the green light, and the blue light emitted by them.

FIG. 1 shows a case where mounting boards 21 each having five LEDs 22 arranged thereon and mounting boards 22 each having eight LEDs 22 arranged thereon are used in combination. Each of the mounting boards 21 with five LEDs 22 is coupled to any one of the mounting boards 21 with eight LEDs 22 through the connection of connectors 25 which are each attached to one far-end edge of a corresponding one of the mounting boards 21 (it goes without saying that the connectors 25 are separated into male and female connectors).

A plurality of pairs each composed of one mounting board 21 having five LEDs 22 and one mounting board 21 having eight LEDs 22 are arranged on the chassis 41 in parallel with each other. On each of the mounting boards 21, the LEDs 22 are aligned along the longer-side direction of the chassis 41, that is, along the direction indicated by arrow X in FIG. 1, and the pairs each composed of two mounting boards 21 are aligned along the shorter-side direction of the chassis 41, that is, along the direction indicated by arrow Y in FIG. 1, as a result of which the LEDs 22 are arranged to form a matrix. The mounting boards 21 are fixed to the chassis 41 by appropriate means such as swaging, bonding, screwing, or riveting.

The built-in reflection sheet 11 is disposed between the mounting board 21 and the diffusion lens 24. The built-in reflection sheet 11 is fixed to the mount surface 21U at a position that faces the bottom surface of the diffusion lens 24. The built-in reflection sheet 11 has a higher optical reflectance than the mounting board 21. The built-in reflection sheet 11 is also circular in plan and concentric with the diffusion lens 24. In diameter, the built-in reflection sheet 11 is larger than the diffusion lens 24.

The built-in reflection sheet 11, which is a resin foam sheet containing a large number of fine air bubbles, exploits the interface reflection in the air bubbles to the full and has a high optical reflectance. Polyethylene-terephthalate (PET) foam sheets having a reflectance of 98% or more are available, and thus, it is desirable to adopt such a sheet. In the built-in reflection sheet 11, there are formed through holes through which the legs 24a of the diffusion lens 24 are inserted. Incidentally, in FIG. 3, illustration of the built-in reflection sheet 11 is omitted.

On the chassis 41, a reflection sheet 42, which is similar to the chassis 41 in plan, is superposed. The reflection sheet 42 is also a resin foam sheet similar to the built-in reflection sheet 11. In the reflection sheet 42, corresponding to the positions of the light emitting modules MJ, there are formed apertures 42H1 each having a shape of a circle that is sized such that the diffusion lens 24 can pass therethrough while the built-in reflection sheet 11 cannot. Further, in the reflection sheet 42, corresponding to the positions of the connectors 25, there are formed rectangular apertures 42H2 for the connectors 25 to protrude therethrough.

In the backlight unit 49, the connectors 25, which electrically connect the mounting boards 21 to each other are placed in a state in which they do not interfere with the irradiation light region in which the LEDs 22 impart brightness to the diffusion plate 43. LEDs 22 emit fractional light in the horizontal direction or a substantially horizontal direction as well, but such light is not expected to impart brightness to the diffusion plate 43 and is also weak, and thus is ignorable. It is assumed that the irradiation light region in this case is substantially the light area that is able to function as a backlight. Here, since the diffusion lenses 24 covers the LEDs 22, light from the diffusion lenses 24 forms the irradiation light region.

For the purpose of securely placing the connectors 25 in a state in which they do not interfere with the irradiation light region in which the LEDs 22 impart brightness to the diffusion plate 43, the following shape is imparted to the connectors 25. That is, among edges of the connectors 25, at least one located on the side that faces an LED 22 is formed to be away from the LED 22.

Figure 2:
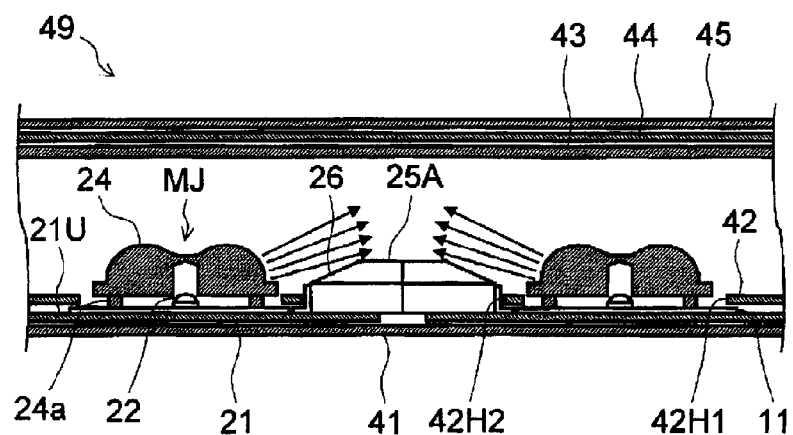
[FIG. 2] A sectional view showing a mounting-board joint portion of the illumination device according to a first embodiment.
Figure 3:
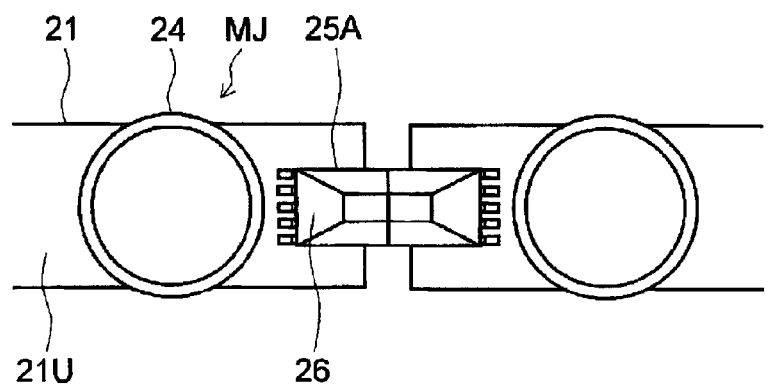
[FIG. 3] A plan view showing the mounting-board joint portion of FIG. 2.

In the illumination device of the first embodiment shown in FIG. 2 and FIG. 3, the connectors 25 are denoted with an additional letter A. In the connectors 25A, beveled parts 26 are formed at edges thereof, to thereby achieve an effect of keeping the edges away from the LEDs 22.

Since the connectors 25A have their edges beveled into the beveled parts 26, the connectors 25A are placed in a state in which they do not interfere with the irradiation light region in which the LEDs 22 impart brightness to the diffusion plate 43. As a result, uneven brightness attributable to the connectors 25A is not observed in the diffusion plate 43, and the quality of images displayed on the liquid crystal display panel 59 is improved. The size and the inclination angle of the beveled part 26 are so set as to help achieve the object of placing the edges of the connectors 25A in a state in which they do not interfere with the irradiation light region in which the LEDs 22 impart brightness to the diffusion plate 43.

As shown in FIG. 3, in each of the connectors 25A, three of the four sides of the top surface are each formed into the beveled part 26, that is, excluding one side at which the connector 25A contacts the counter connector 25A. However, depending on the positional relationship between the matrix of the light emitting modules MJ and the connectors 25A, it is possible, in each of the connectors 25A, to form the beveled part 26 solely at the side that faces the nearest light emitting module MJ, with no beveled part 26 formed at either of the other two sides that are perpendicular to this side, that is, in FIG. 3, the upper and lower sides.

Figure 4:
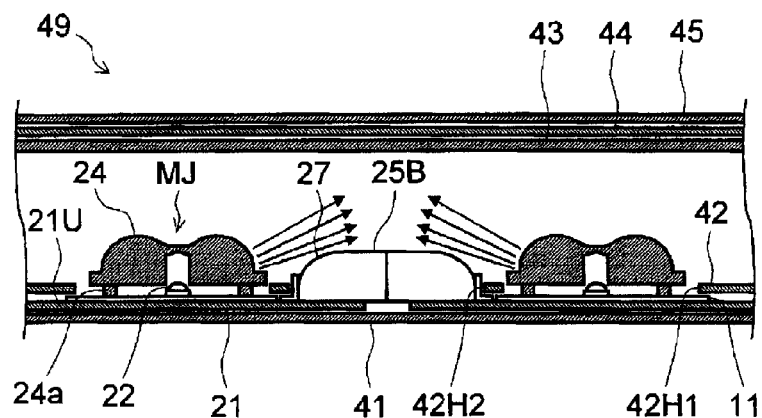
[FIG. 4] A sectional view showing a mounting-board joint portion of an illumination device according to a second embodiment.

FIG. 4 shows a second embodiment of the illumination device. The second embodiment is different from the first embodiment in connector shape. That is, each of connectors 25B used in the second embodiment is formed such that a rounded part 27, not a beveled part, is formed at an edge thereof that is located on a side that faces an LED 22.

The rounded part 27 is also effective in keeping edges away from the LEDs 22. Thus, the connectors 25B are placed in a state in which they do not interfere with the irradiation light region in which the LEDs 22 impart brightness to the diffusion plate 43. As a result, uneven brightness attributable to the connectors 25B is not observed in the diffusion plate 43, and the quality of images displayed on a liquid crystal display panel 59 is improved. The size of the rounded part 27 is so set as to help achieve the object of placing the edges of the connector 25B in a state in which they do not interfere with the irradiation light region in which the LEDs 22 impart brightness to the diffusion plate 43.

Like the beveled part 26 of the first embodiment, in each of the connectors 25B, three of the four sides of the top surface may each be formed into the rounded part 27, that is, excluding one side at which the connector 25B contacts the counter connector 25B, or it is possible to form the rounded part 27 solely at the side that faces the nearest light emitting module MJ.

Figure 5:
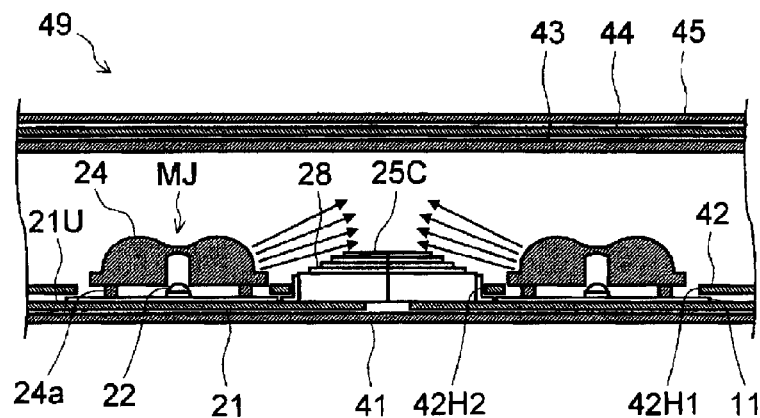
[FIG. 5] A sectional view showing a mounting-board joint portion of an illumination device according to a third embodiment.

FIG. 5 shows a third embodiment of the illumination device. The third embodiment is different from the first and second embodiments in connector shape. That is, each of connectors 25C used in the third embodiment is formed such that a stepped part 28 is formed at an edge thereof that is located on a side that faces an LED 22. There is no particular limitation to the number of steps of which the stepped part 28 is formed.

The stepped part 28 is also effective in keeping edges away from the LEDs 22. Thus, the connectors 25C are placed in a state in which they do not interfere with the irradiation light region in which the LEDs 22 impart brightness to the diffusion plate 43. As a result, uneven brightness attributable to the connectors 25C is not observed in the diffusion plate 43, and the quality of images displayed on a liquid crystal display panel 59 is improved. The size and the inclination angle of the stepped part 28 are so set as to help achieve the object of placing the edges of the connectors 25C in a state in which they do not interfere with the irradiation light region in which the LEDs 22 impart brightness to the diffusion plate 43.

In this case as well, like in the cases of the beveled part 26 and the rounded part 27, three of the four sides of the top surface of each of the connectors 25C may each be formed into the stepped part 28, that is, excluding one side at which the connector 25C contacts the counter connector 25C, or it is possible to form the stepped part 28 solely at the side that faces the nearest light emitting module MJ.

Figure 6:
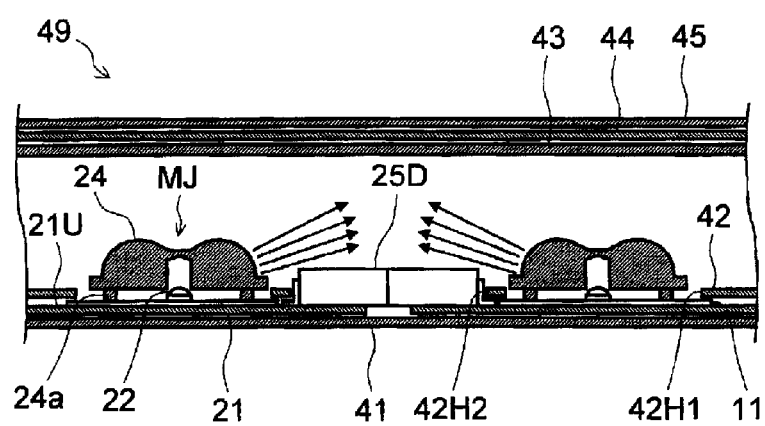
[FIG. 6] A sectional view showing a mounting-board joint portion of an illumination device according to a fourth embodiment.

FIG. 6 shows a fourth embodiment of the illumination device. The approach taken in the fourth embodiment is different from those taken in the first to third embodiments. Specifically, in the fourth embodiment, connectors are formed with a reduced height to thereby shape them such that they do not interfere with an irradiation light region in which LEDs 22 impart brightness to a diffusion plate 43.

The connectors 25D shown in FIG. 6 are formed such that the height thereof itself is shorter than the maximum heights of the connectors of the first to third embodiments, and thus, the connectors 25D are placed in a state in which they do not interfere with the irradiation light region in which the LEDs 22 impart brightness to the diffusion plate 43. As a result, uneven brightness attributable to the connectors 25D is not observed in the diffusion plate 43, and the quality of images displayed on a liquid crystal display panel 59 is improved.

Figure 7:
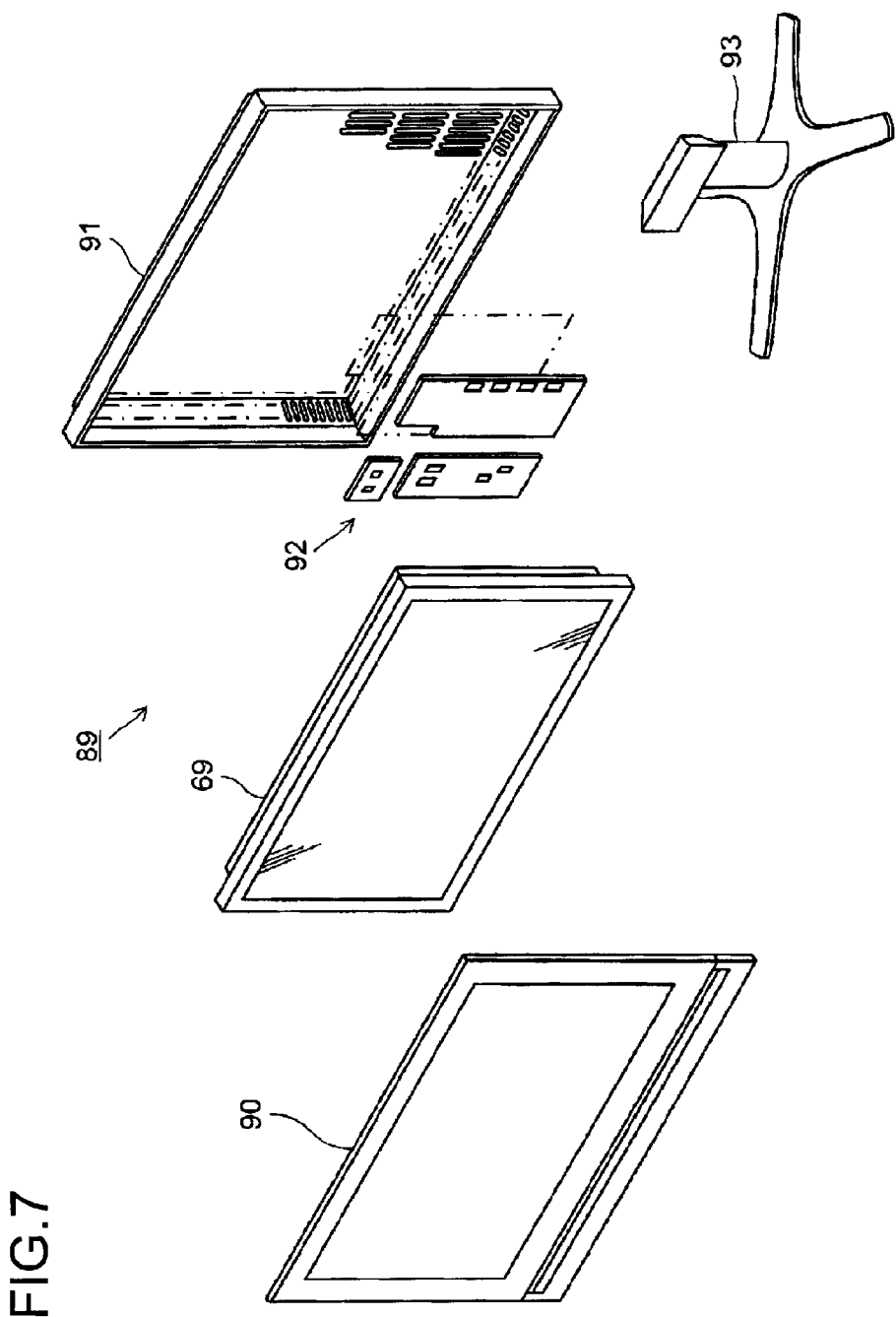
[FIG. 7] An exploded perspective view showing a television receiver.

FIG. 7 shows an example of the configuration of a television receiver in which a display device 69 is incorporated. A television receiver 89 is configured such that the display device 69 and a group of control boards 92 are housed in a cabinet composed of a front cabinet 90 and a rear cabinet 91 which are attached to each other, the cabinet being supported by a stand 93.

It is to be understood that the present invention may be carried out in any other manner than specifically described above as embodiments, and many modifications and variations are possible within the scope of the present invention. For example, the present invention is applicable to a connector for connecting mounting boards on which light emitting elements that are not covered with diffusion lenses are arranged.

Industrial Applicability

The present invention is widely applicable to illumination devices, display devices including the illumination devices, and television receivers provided with the display devices.

List of Reference Symbols 49 backlight unit
41 chassis
43 diffusion plate
MJ light emitting module
11 built-in reflection sheet
21 mounting board
22 LED
24 diffusion lens
25, 25A, 25B, 25C, 25D connector
26 beveled part
27 rounded part
28 stepped part
59 liquid crystal display panel
69 display device
89 television receiver

The invention claimed is:

1. An illumination device, comprising:
a diffusion plate; and
a light source which is configured to irradiates the diffusion plate with light, the light source including:
  a plurality of mounting boards each including at least one light emitting element mounted thereon; and
at least one connector configured to electrically connect two of the plurality of mounting boards to each other; wherein
the at least one connector includes a top surface provided between the two of the plurality of mounting boards and the diffusion plate, the top surface including a flat portion which has a width in a direction parallel to a top surface of the two of the plurality of mounting boards, the width of the flat portion is smaller than a width of a bottom portion of the at least one connector in the direction.

2. The illumination device of claim 1, further comprising:
a diffusion lens which covers the light emitting element, wherein
substantially no light from the at least one light emitting element is blocked from reaching the diffusion lens by the at least one connector.

3. The illumination device of claim 1, wherein,
among edges of the at least one connector, at least an edge of the top surface which is located on a side that faces the at least one light emitting element is arranged to be positioned away from the at least one light emitting element, to thereby impart to the at least one connector a shape which allows the at least one connectors to be in a state in which the at least one connector does not interfere with light from the at least one light emitting element reaching the diffusion plate.

4. The illumination device of claim 3, wherein,
among all edges of the at least one connector, at least the edge of the top surface which is located on the side that faces the at least one light emitting element is positioned away from the at least one light emitting element by locating a beveled portion at the edge.

5. The illumination device of claim 3, wherein
among all edges of the at least one connector, at least the edge of the top surface which is located on the side that faces the at least one light emitting element is positioned away from the at least one light emitting element by locating a rounded portion the edge.

6. The illumination device of claim 3, wherein,
among all edges of the at least one connector, at least the edge of the top surface which is located on the side that faces the at least one light emitting element is positioned away from the at least one light emitting element by locating stepped portion at the edge.

7. The illumination device of claim 1, wherein the at least one light emitting element is an LED.

8. A display device, comprising:
any number of illumination devices of the illumination devices of claim 1; and
a display panel which receives light from the any number of illumination devices.

9. The display device of claim 8, wherein the display panel is a liquid crystal display panel.

10. A television receiver, comprising: the display device of claim 8.

11. The illumination device of claim 1, wherein a plane including the direction also includes an imaginary straight line extending between two of the at least one light emitting elements on different ones of the two of the plurality of mounting boards, the two of the at least one light emitting elements on different ones of the two of the plurality of mounting boards being positioned to sandwich the at least one connector.

* * * * *